(12) United States Patent
Weitbruch et al.

(10) Patent No.: US 8,254,466 B2
(45) Date of Patent: Aug. 28, 2012

(54) METHOD AND DEVICE FOR TEXTURE BASED CODING

(75) Inventors: Sébastien Weitbruch, Kappel (DE); Carlos Correa, Villingen-Schwenningen (DE); Dennis Cota, Villingen (DE)

(73) Assignee: Thomson Licensing, Boulogne Billancourt (FR)

( * ) Notice: Subject to any disclaimer, the term of this patent is extended or adjusted under 35 U.S.C. 154(b) by 1335 days.

(21) Appl. No.: 11/630,304

(22) PCT Filed: Jun. 10, 2005

(86) PCT No.: PCT/EP2005/052700
§ 371 (c)(1),
(2), (4) Date: Sep. 7, 2007

(87) PCT Pub. No.: WO2006/003075
PCT Pub. Date: Jan. 12, 2006

(65) Prior Publication Data
US 2008/0130759 A1    Jun. 5, 2008

(30) Foreign Application Priority Data

Jul. 1, 2004   (EP) .................................... 04291674

(51) Int. Cl.
*H04N 7/12*      (2006.01)
*H04N 11/02*     (2006.01)
*H04N 11/04*     (2006.01)

(52) U.S. Cl. ................................................. 375/240.26
(58) Field of Classification Search ............. 375/240.26
See application file for complete search history.

(56) References Cited

U.S. PATENT DOCUMENTS

| 6,473,464 B1 * | 10/2002 | Weitbruch et al. ........ 375/240.26 |
| 6,665,429 B1 * | 12/2003 | Wang ............................. 382/128 |
| 6,894,664 B2 * | 5/2005 | Thebault et al. ................ 345/60 |
| 2003/0052841 A1 | 3/2003 | Tanaka et al. |
| 2003/0063107 A1 * | 4/2003 | Thebault et al. .............. 345/690 |

FOREIGN PATENT DOCUMENTS

| EP | 1256924 | 11/2002 |
| EP | 1276096 | 1/2003 |

OTHER PUBLICATIONS

Search Report Dated Nov. 22, 2005.

* cited by examiner

*Primary Examiner* — Eleni Shiferaw
*Assistant Examiner* — Jing Sims
(74) *Attorney, Agent, or Firm* — Tutunjian & Bitetto, P.C.

(57) ABSTRACT

For reducing the false contour effect the gravity center coding is utilized. However, a GCC with a few number of levels introduces noise in a picture. Therefore, each picture is divided into segments and such GCC is performed only in regions, where the false contour effect is critical. This is the case for skin areas of a picture. Such areas are detected by the color analysis and texture analysis. If this analysis leads to a skin area, a specific false contour mode for data processing is used. Otherwise, a standard mode is employed.

7 Claims, 19 Drawing Sheets

METHOD AND DEVICE FOR TEXTURE BASED CODING

This application claims the benefit, under 35 U.S.C. §365 of International Application PCT/EP2005/052700, filed Jun. 10, 2005, which was published in accordance with PCT Article 21(2) on Jan. 12, 2006 in English and which claims the benefit of European patent application No. 04291674.2 filed Jul. 1, 2004.

The invention relates to a method for processing video data for display on a display device having a plurality of luminous elements corresponding to the pixels of a picture, wherein the time of a video frame or field is divided into a plurality of sub-fields during which the luminous elements can be activated for light emission in small pulses corresponding to a sub-field code word of n bits used for encoding the p possible video levels lighting a pixel, by encoding a first part of the picture using a first encoding method, wherein among a pre-given set of possible video levels for lighting a pixel, a sub-set of m video levels with n<m<p is selected which is used for light generation, said m values being selected according to the rule that the temporal centre of gravity for the light generation of the corresponding sub-field code words grows continuously with the video level. Furthermore, the present invention relates to a corresponding device for processing video data.

BACKGROUND

First of all, the false contour effect shall be described. Generally, a Plasma Display Panel (PDP) utilizes a matrix array of discharge cells, which could only be "ON" or "OFF". Therefore, unlike a CRT or LCD in which grey levels are expressed by analogue control of the light emission, a PDP controls grey level by a Pulse Width Modulation (PWM) of each cell. This time-modulation will be integrated by the eye over a period corresponding to the eye time response. The more often a cell is switched on in a given time frame, the higher is its luminance (brightness). For example, when disposing of 8 bit luminance levels (256 levels per colour, so 16.7 million colours), each level can be represented by a combination of the 8 following bits:
1-2-4-8-16-32-64-128

Figure 1:
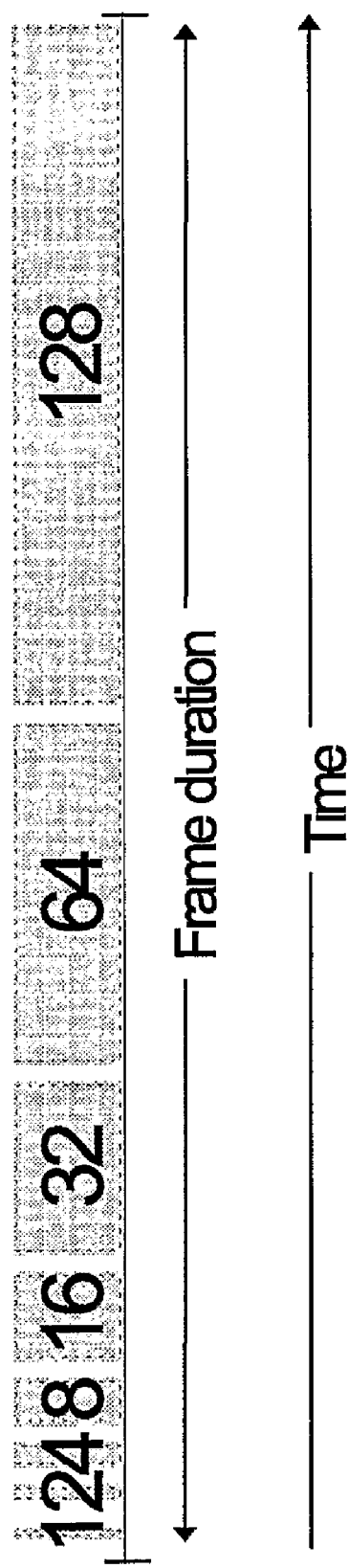

To realize such a coding, the frame period can be divided in 8 lighting sub-periods (called sub-fields), each corresponding to a bit and a brightness level. The number of light pulses for the bit "2" is the double as for the bit "1" etc. With these 8 sub-periods, it is possible through combination to build the 256 grey levels. The eye of an observer will integrate over a frame period these sub-periods to catch the impression of the right grey level. FIG. 1 presents this decomposition.

The light emission pattern introduces new categories of image-quality degradation corresponding to disturbances of grey levels and colours. These will be defined as "dynamic false contour effect" since they correspond to disturbances of grey levels and colours in the form of an apparition of coloured edges in the picture when an observation point on the plasma panel moves. Such failures on a picture lead to the impression of strong contours appearing on homogeneous areas. The degradation is enhanced when the image has a smooth gradation (like skin) and when the light-emission period exceeds several milliseconds.

When an observation point (eye focus area) on the PDP screen moves, the eye will follow this movement. Consequently, it will no more integrate the same cell over a frame (static integration) but it will integrate information coming from different cells located on the movement trajectory and it will mix all these light pulses together, which leads to a faulty signal information.

Basically, the false contour effect occurs when there is a transition from one level to another with a totally different code. So the first point is from a code (with n sub-fields) which permits to achieve p grey levels (typically p=256), to select m grey levels (with m<p) among the $2^n$ possible sub-fields arrangements (when working at the encoding) or among the p grey levels (when working at the video level) so that close levels will have close sub-fields arrangements.

The second point is to keep a maximum of levels, in order to keep a good video quality. For this the minimum of chosen levels should be equal to twice the number of subfields.

For all further examples, a 11 sub-fields mode defined as following is used:
1 2 3 5 8 12 18 27 41 58 80.

For these issues the Gravity Centre Coding (GCC) was introduced in document EP 1 256 924. The content of this document is expressively incorporated by reference herewith.

Figure 2:
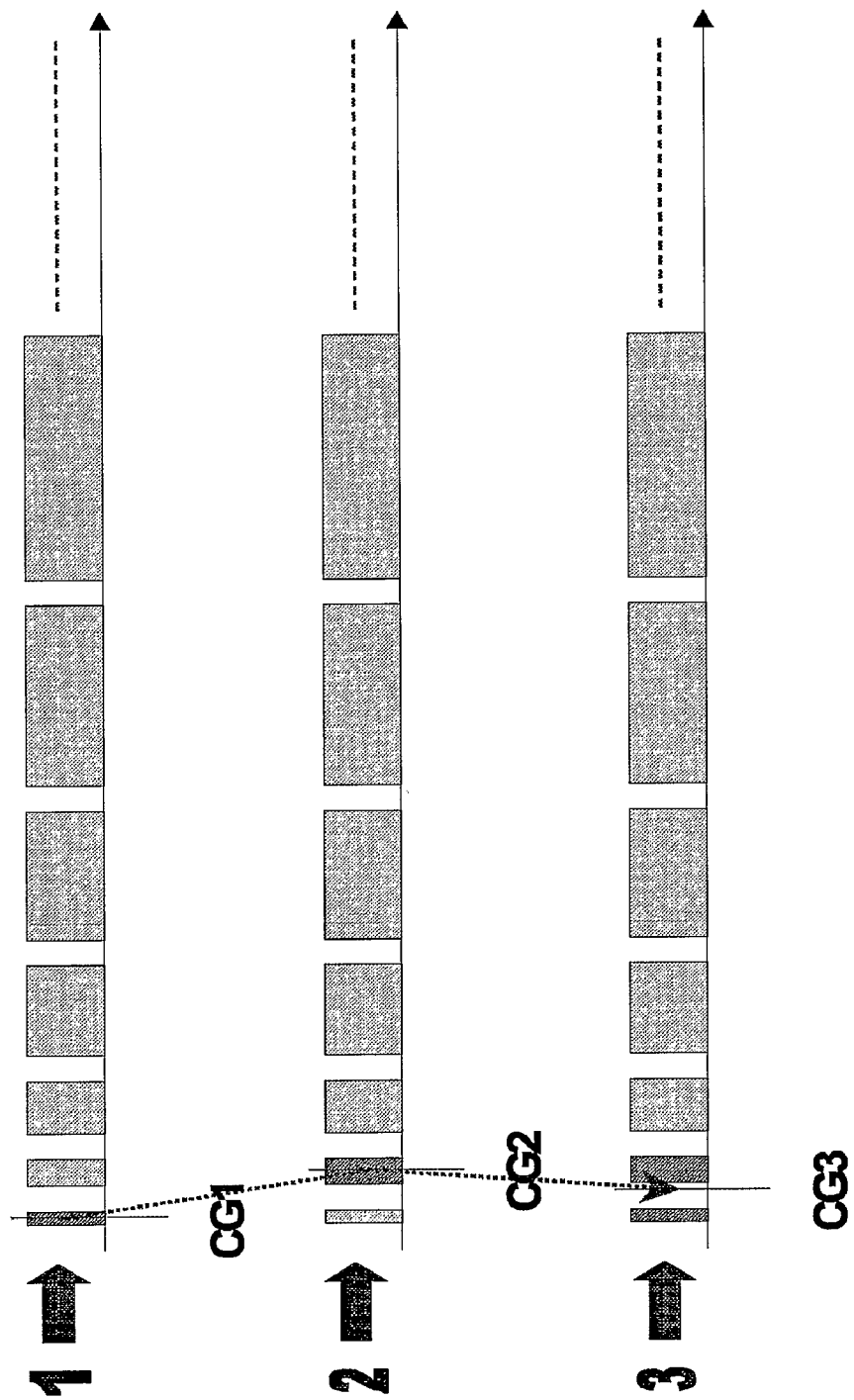

As seen previously, the human eye integrates the light emitted by Pulse Width Modulation. So if one considers all video levels encoded with a basic code, the time position of these video levels (the centre of gravity of the light) is not growing continuously with the video level as shown in FIG. 2.

The centre of gravity CG2 for a video level 2 is larger than the centre of gravity CG1 of video level 1. However, the centre of gravity CG3 of video level 3 is smaller than that of video level 2.

Figure 3:
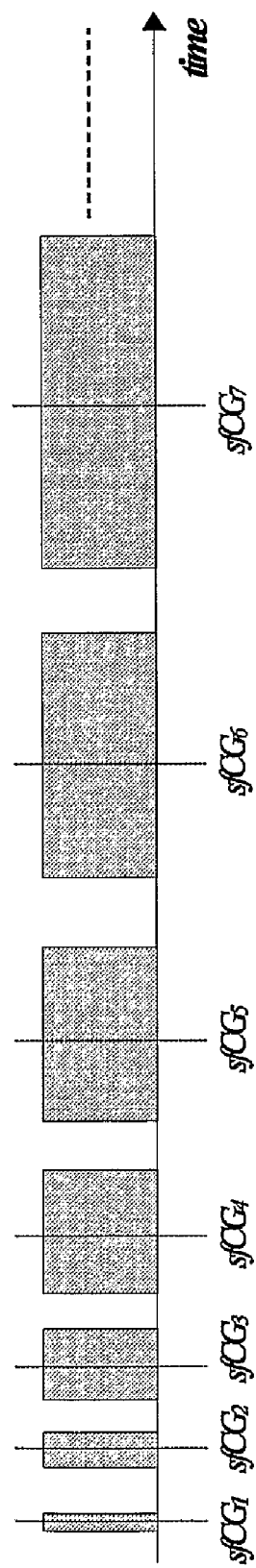

This introduces false contour. The centre of gravity is defined as the centre of gravity of the subfields 'on' weighted by their sustain weight:

$$CG(\text{code}) = \frac{\sum_{i=1}^{n} sfW_i * \delta_i(\text{code}) * sfCG_i}{\sum_{i=1}^{n} sfW_i * \delta_i(\text{code})}$$

where $sfW_i$ is the subfield weight of $i^{th}$ subfield. $\delta_i$ is equal to 1 if the $i^{th}$ subfield is 'on' for the chosen code, 0 otherwise. $SfCG_i$ is the centre of gravity of the $i^{th}$ sub-field, i.e. its time position, as shown in FIG. 3 for the first seven sub-fields.

Figure 4:
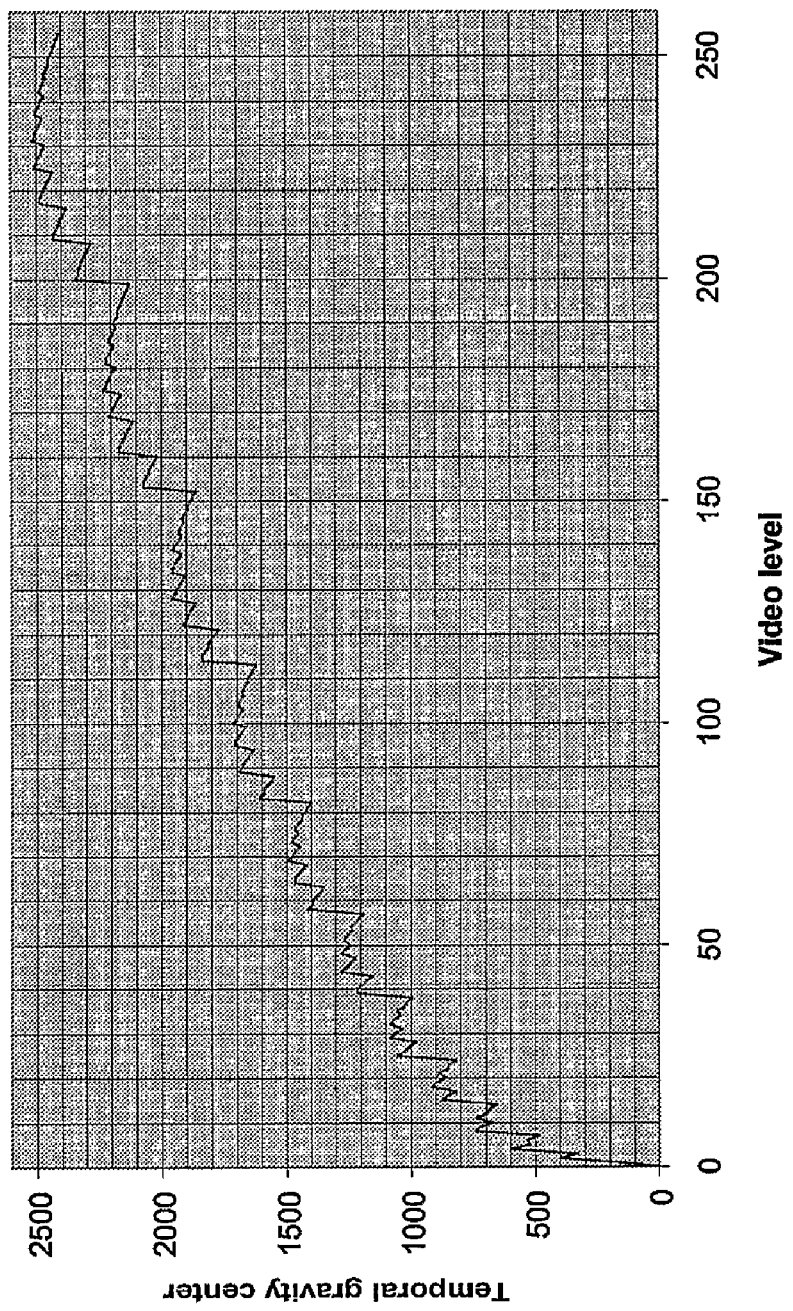

The temporal centres of gravity of the 256 video levels for the 11 subfields code chosen here can be represented as shown in FIG. 4.

Figure 5:
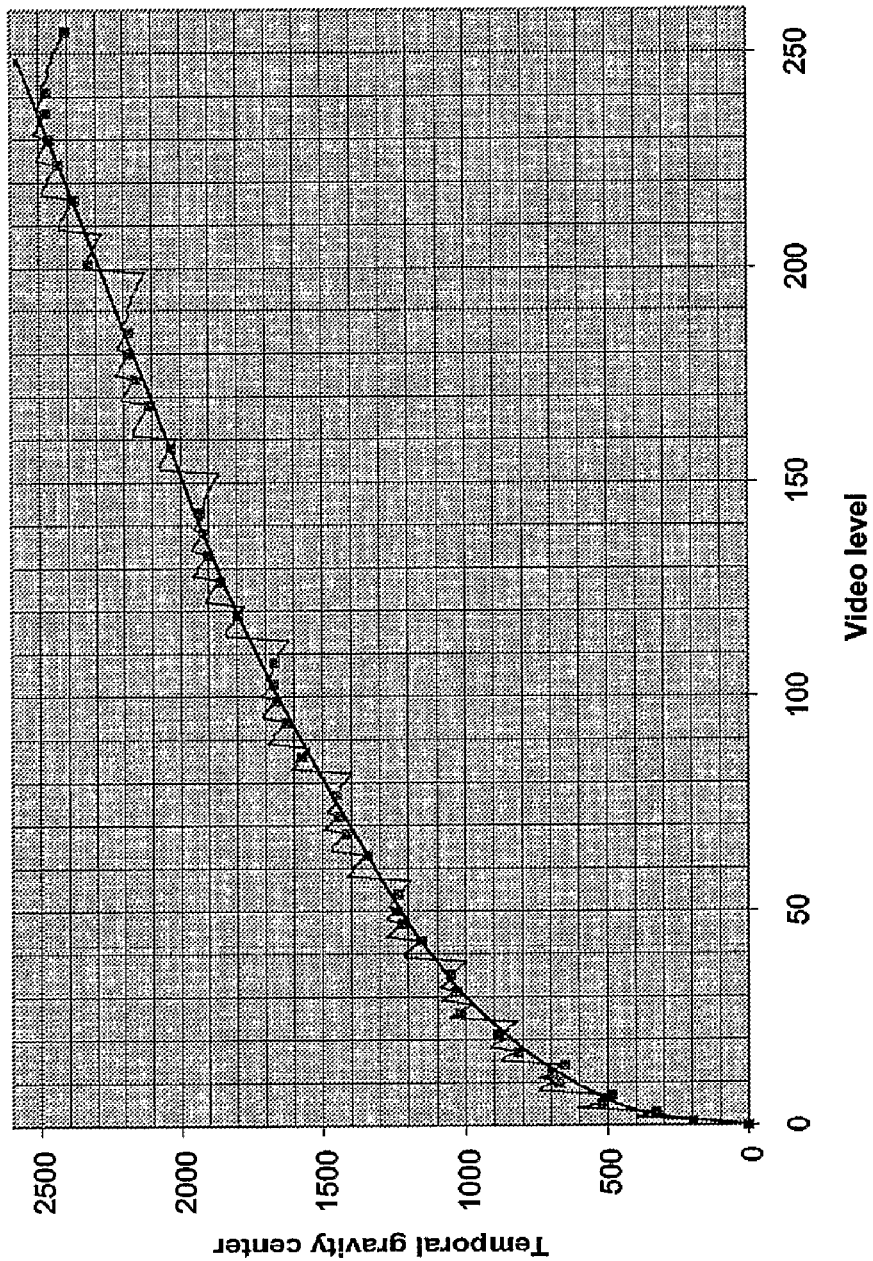

The curve is not monotonous and presents a lot of jumps. These jumps correspond to false contour. According to GCC these jumps are suppressed by selecting only some levels, for which the gravity centre will grow continuously with the video levels apart from exceptions in the low video level range up to a first predefined limit and/or in the high video level range from a second predefined limit on. This can be done by tracing a monotone curve without jumps on the previous graphic, and selecting the nearest point as shown in FIG. 5. Thus, not all possible video levels are used when employing GCC.

In the low video level region it should be avoided to select only levels with growing gravity centre because the number of possible levels is low and so if only growing gravity centre levels were selected, there would not be enough levels to have a good video quality in the black levels since the human eye is very sensitive in the black levels. In addition the false contour in dark areas is negligible.

In the high level region, there is a decrease of the gravity centres, so there will be a decrease also in the chosen levels, but this is not important since the human eye is not sensitive in the high level. In these areas, the eye is not capable to distinguish different levels and the false contour level is negligible regarding the video level (the eye is only sensitive to relative amplitude if the Weber-Fechner law is considered). For these reasons, the monotony of the curve will be necessary just for the video levels between 10% and 80% of the maximal video level.

In this case, for this example, 40 levels (m=40) will be selected among the 256 possible. These 40 levels permit to keep a good video quality (grey-scale portrayal).

This selection can be made when working at the video level, since only few levels (typically 256) are available. But when this selection is made at the encoding, there are $2^n$ (n is the number of sub-fields) different sub-fields arrangements, and so more levels can be selected as seen on FIG. 6, where each point corresponds to a sub-fields arrangement (there are different subfields arrangements giving a same video level).

Furthermore, this method can be applied to different codings, like 100 Hz for example without changes, giving also good results.

On one hand, the GCC concept enables a visible reduction of the false contour effect. On the other hand, it introduces noise in the picture in the form of dithering needed since less levels are available than required. The missing levels are then rendered by means of spatial and temporal mixing of available GCC levels. The false contour effect is an artefact that only appears on specific sequences (mostly visible on large skin area) whereas the introduced noise is visible all the time and can give an impression of noisy display. For that reason, it is important to use the GCC method only if there is a risk of false contour artefacts.

Document EP 1 376 521 introduces a solution for this based on a motion detection enabling to switch ON or OFF the GCC depending on whether there is or not a lot of motion in the picture.

INVENTION

In view of that, it is the object of the present invention to provide a method and a device which enable the usage of GCC with reduced false contour effect disturbances.

According to the present invention this object is solved by a method for processing video data for display on a display device having a plurality of luminous elements corresponding to the pixels of a picture, wherein the time of a video frame or field is divided into a plurality of sub-fields during which the luminous elements can be activated for light emission in small pulses corresponding to a sub-field code word of n bits used for encoding the p possible video levels lighting a pixel, comprising the steps of encoding a first part of the picture using a first encoding method, wherein among the set of possible video levels for lighting a pixel, a sub-set of m video levels with n<m<p is selected, which is used for light generation, said m values being selected according to the rule that the temporal centre of gravity for the light generation of the corresponding sub-field code words grow continuously with the video level, selecting said first part of the picture on the basis of predetermined criteria and encoding at least one second part different from said first part of the picture using a second encoding method different from said first encoding method.

Furthermore, the present invention provides a device for processing video data for display on a display device having a plurality of luminous elements corresponding to the pixels of a picture, wherein the time of a video frame or field is divided into a plurality of sub-fields during which the luminous elements can be activated for light emission in small pulses corresponding to a sub-field code word of n bits used for encoding the p possible video levels lighting a pixel, comprising encoding means for encoding a first part of the picture using a first encoding method, wherein among a pre-given set of possible video levels for lighting a pixel, a sub-set of m video levels with n<m<p is selected, which is used for light generation, said m values being selected according to the rule that the temporal centre of gravity for the light generation of the corresponding sub-field code words grow continuously with the video level, and selecting means connected to said encoding means for selecting said first part of the picture on the basis of predetermined criteria, wherein said encoding means is adapted for encoding at least one second part different from said first part of the picture using a second encoding method different from said first encoding method.

According to the inventive idea a GCC is limited to specific picture areas, having a risk of false contour artefacts. Other areas shall not be GCC coded or coded with another GCC having a lot of selected levels so that in summary the risk of visible false contour artefacts is reduced.

Preferably, the selection criteria for the first part of the picture, in which the GCC coding is implemented, are: Homogeneous area having a size larger than a predetermined minimum size. Thus, there is a homogeneous area being sensible to the false contour effect and the GCC is applied specifically to this area to reduce artefacts.

The homogeneous area may have a predetermined texture. In that case, the pictures are analysed for such texture. Furthermore, the homogeneous area may have a predetermined colour like skin colour. Such a skin area is very sensitive to the false contour effect as described above.

The skin colour may be determined by the phase angle and the amplitude of a colour space diagram. The determination is simple to be implemented, since the amplitude as well as the phase angle only have to lie within certain ranges.

Independent of the above features, the first encoding method (GCC) shall not be used in an area, if the skewness of this area is larger than a minimum skewness and the kurtosis of this area is larger than a minimum kurtosis. Thus, a homogeneous area can be found with a high degree of certainty by analysing the structure of the histogram of a picture area.

DRAWINGS

Figure 6:
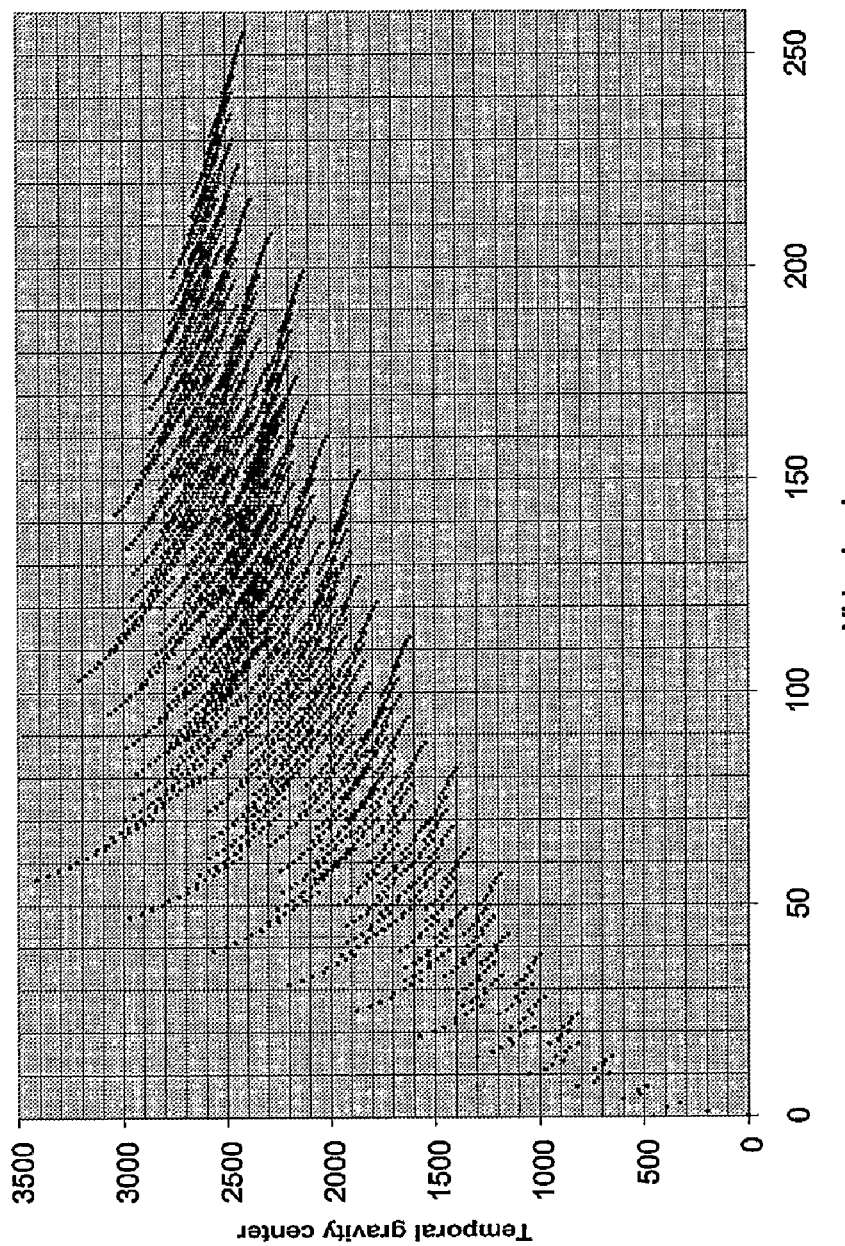
Figure 7:
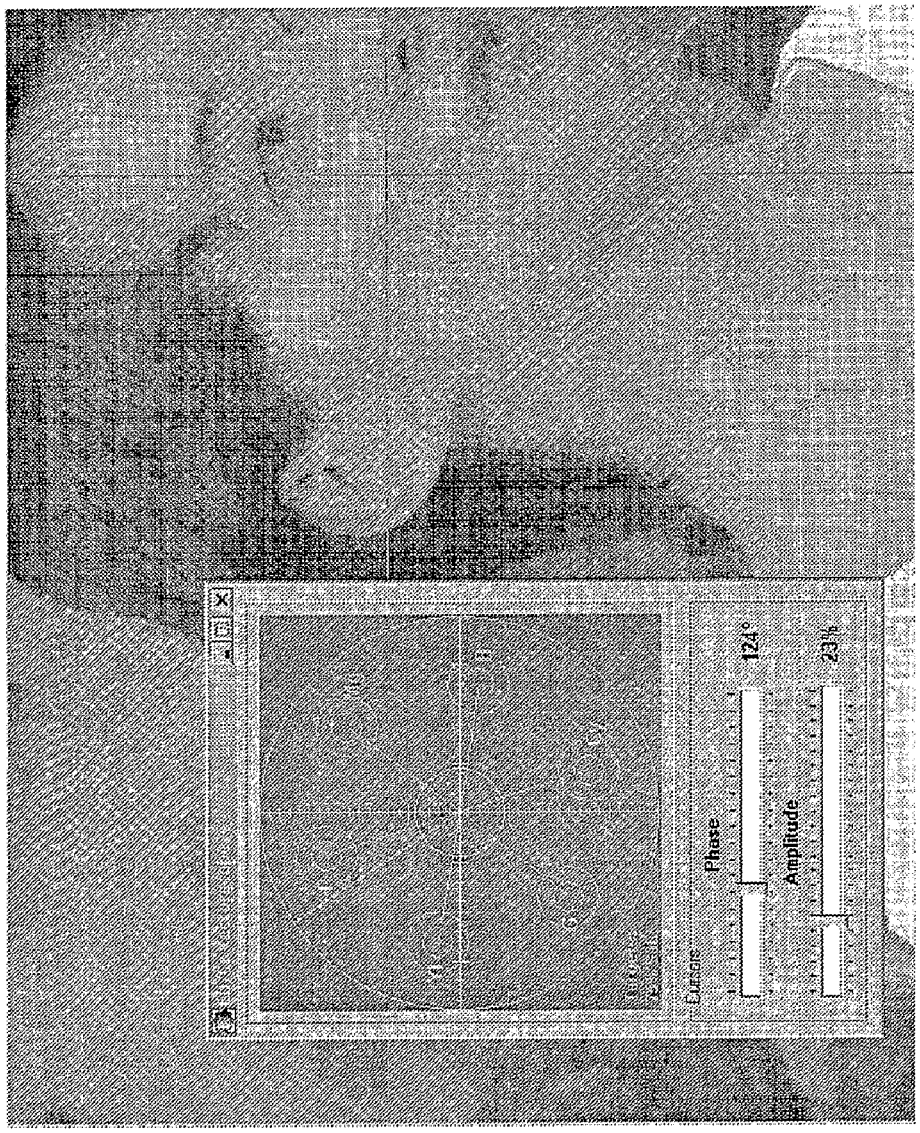
Figure 8:
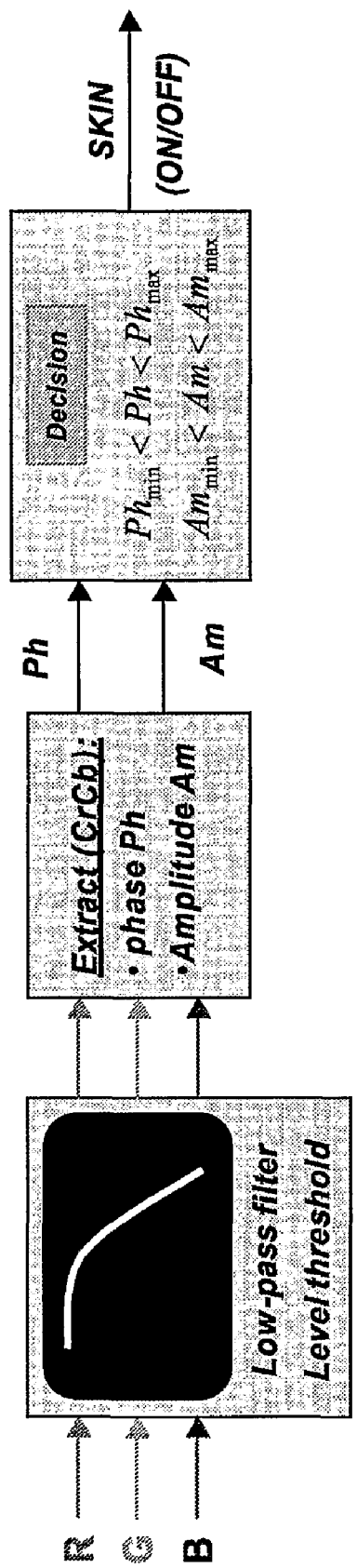
Figure 9:
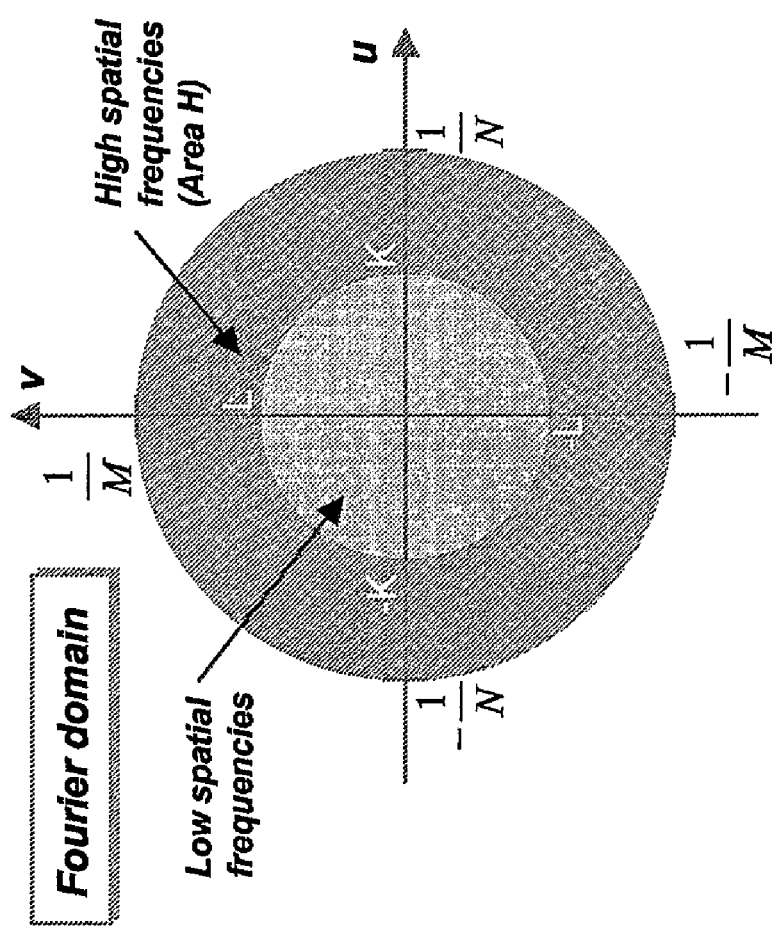
Figure 10:
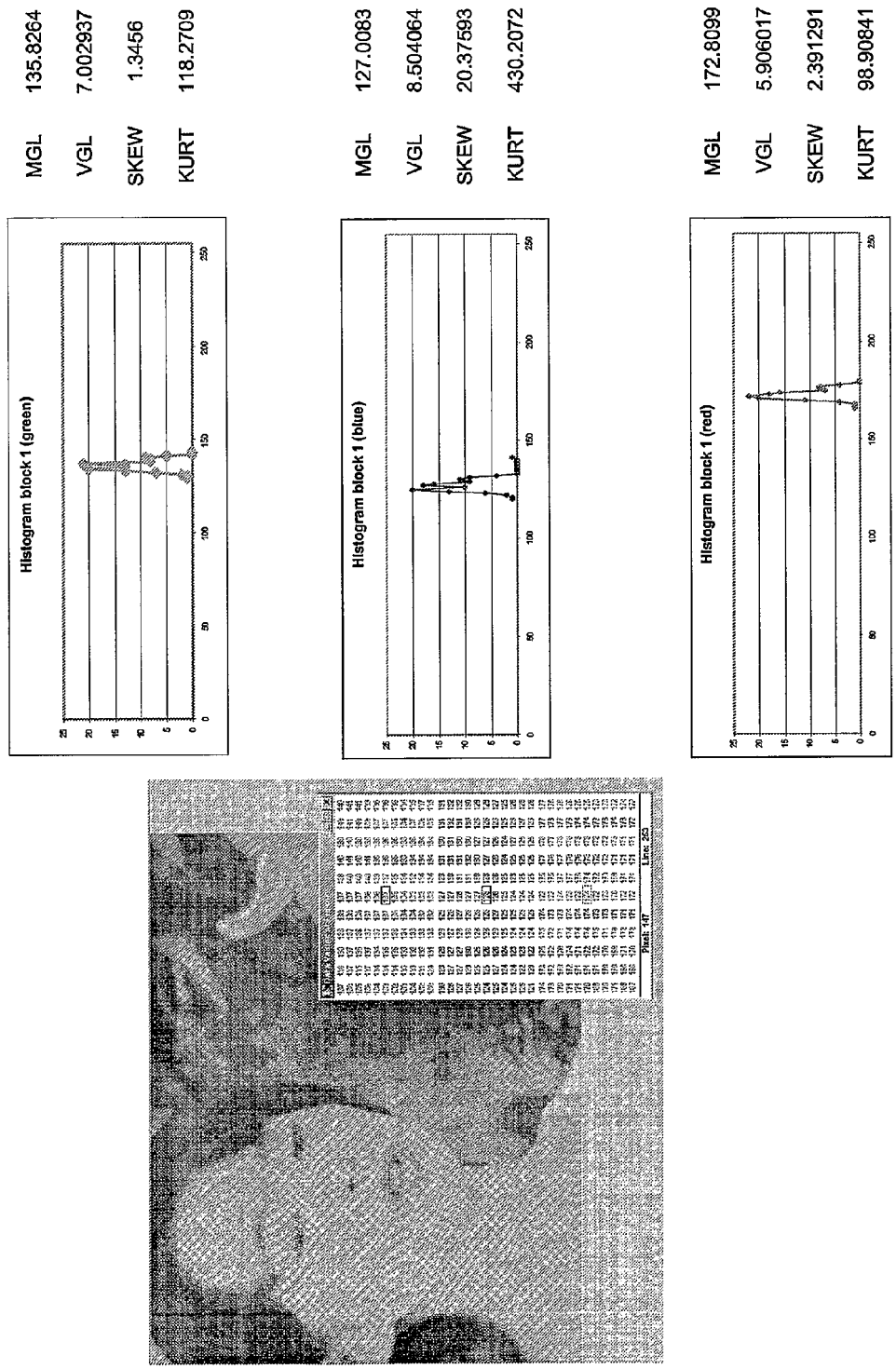
Figure 11:
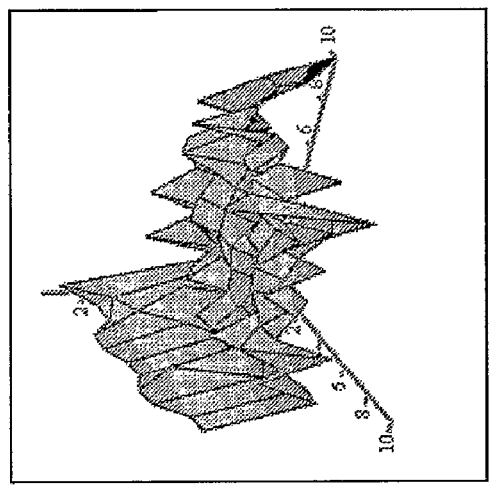
Figure 11:
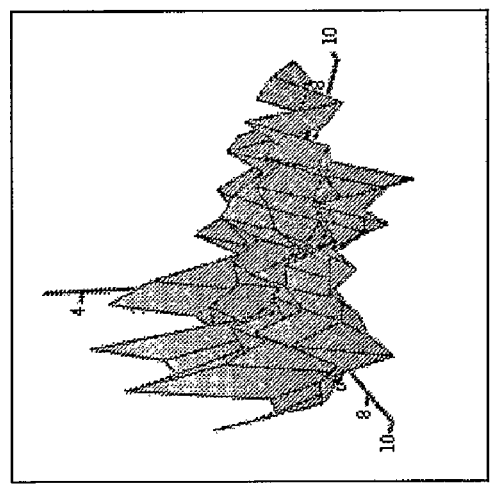
Figure 11:
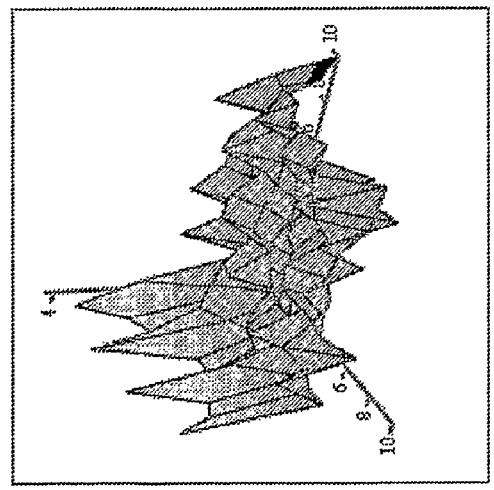
Figure 12:
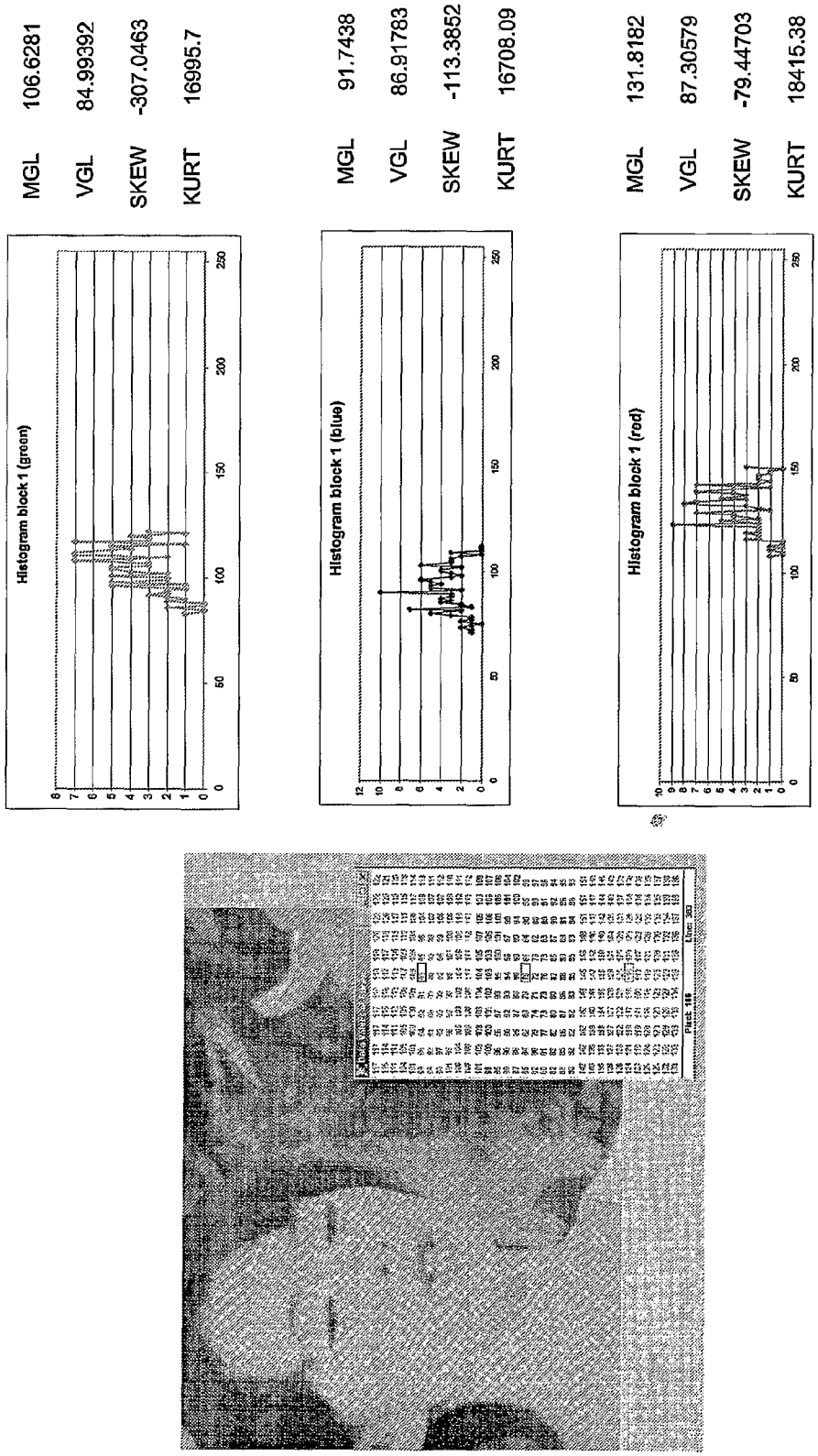
Figure 13:
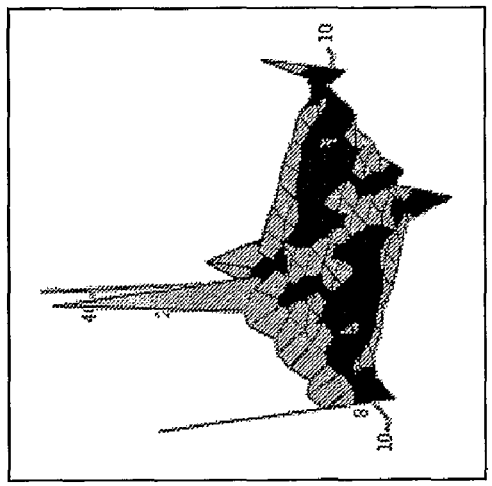
Figure 13:
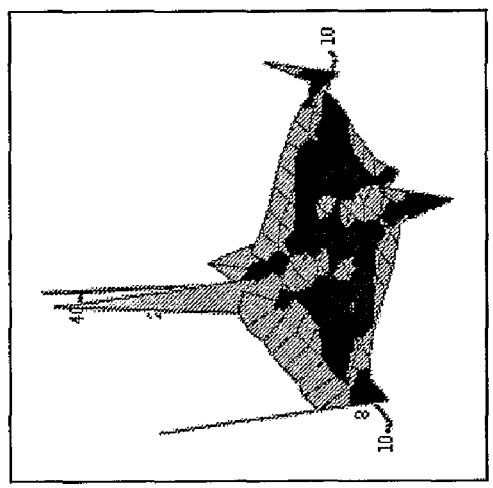
Figure 13:
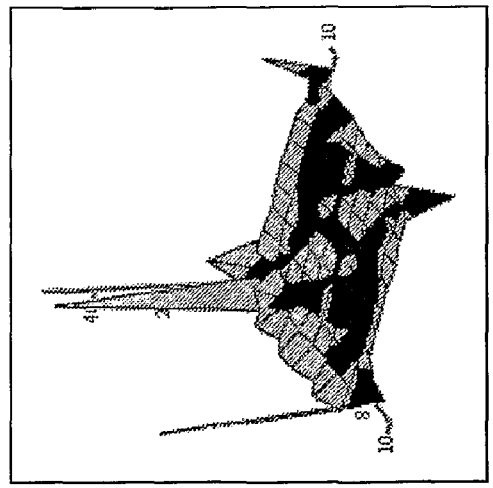
Figure 14:
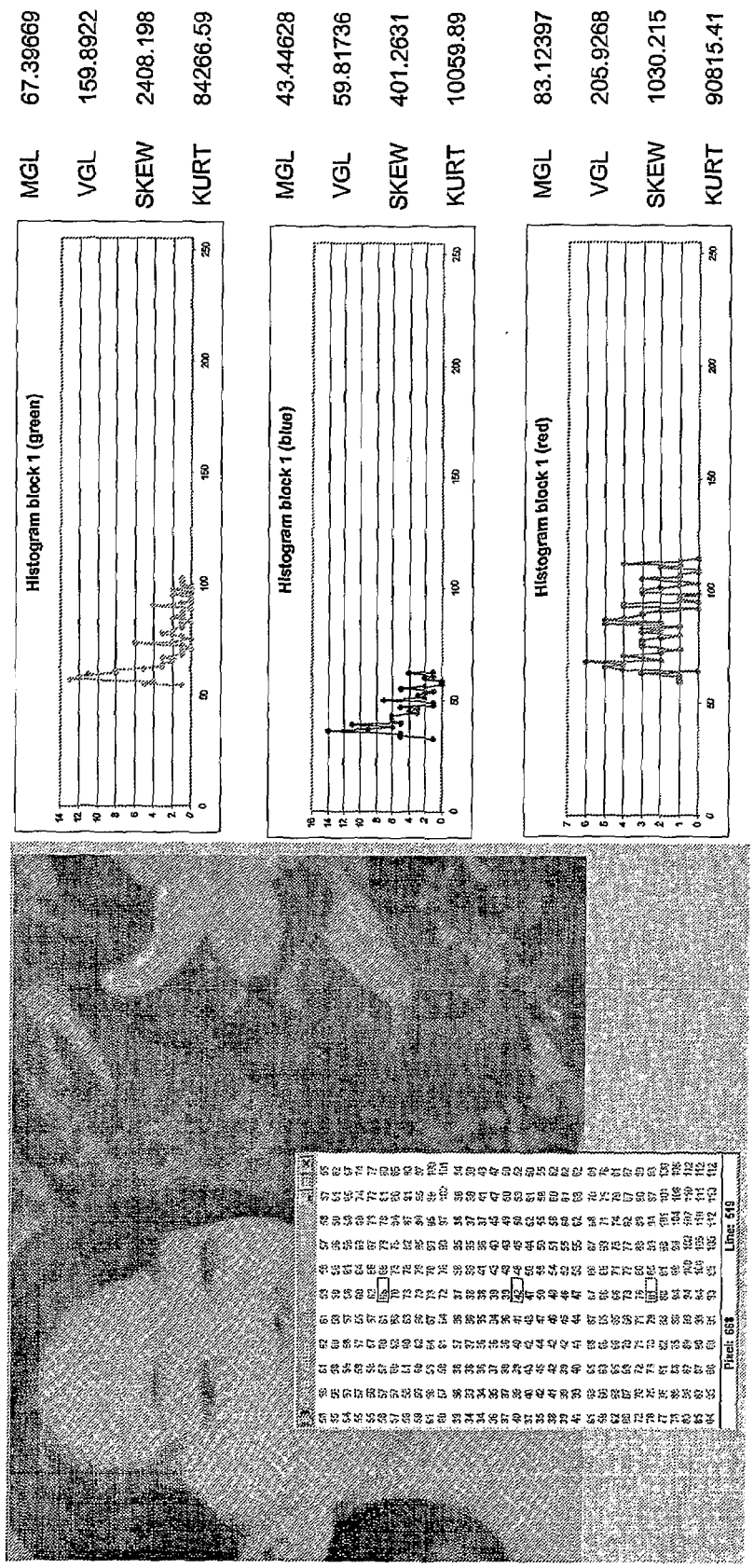
Figure 15:
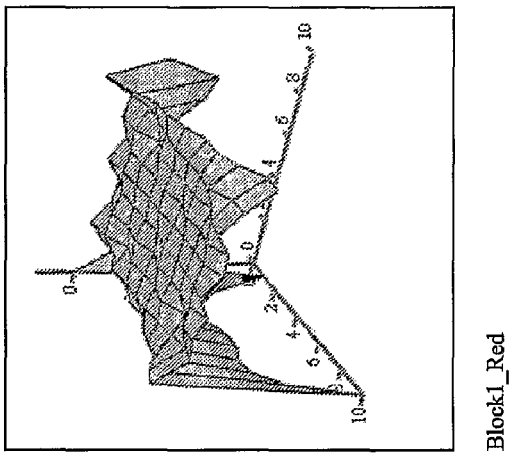
Figure 15:
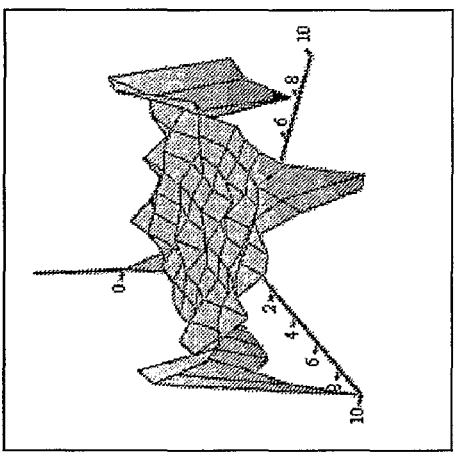
Figure 15:
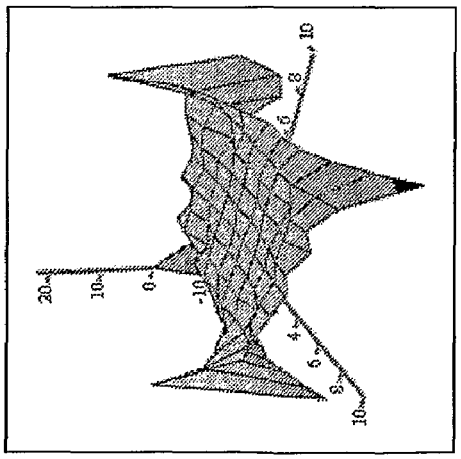
Figure 16:
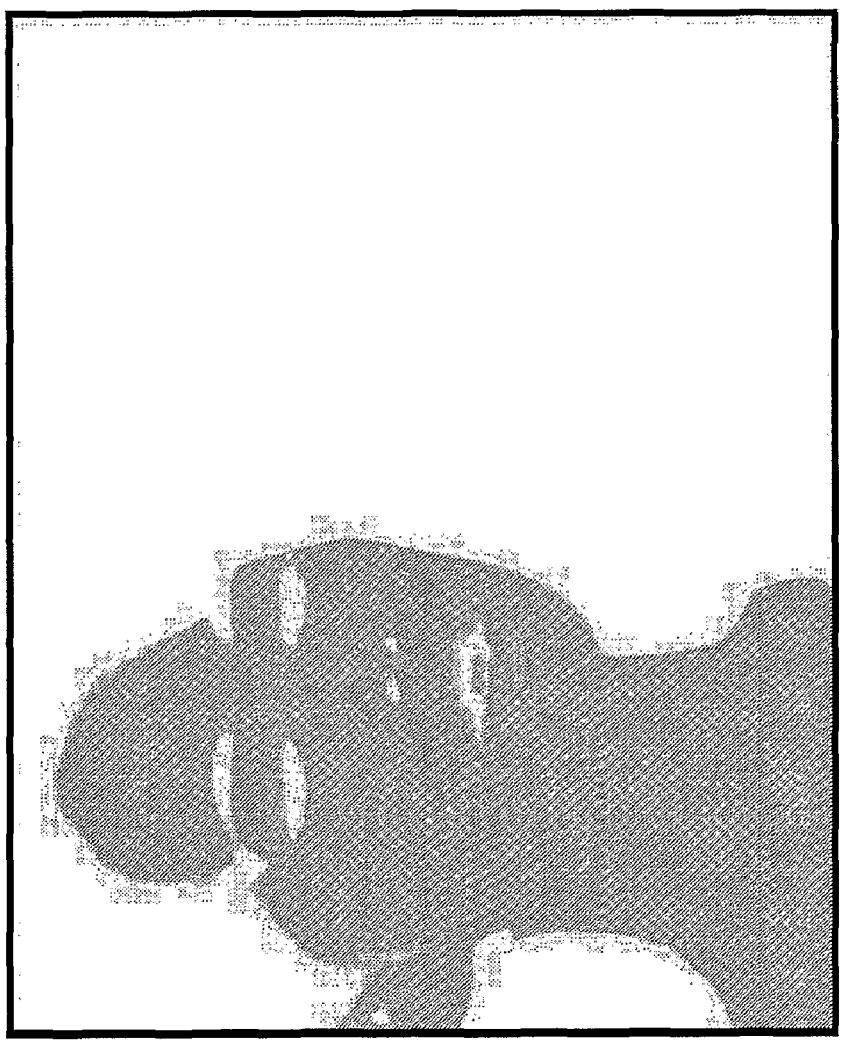
Figure 17:
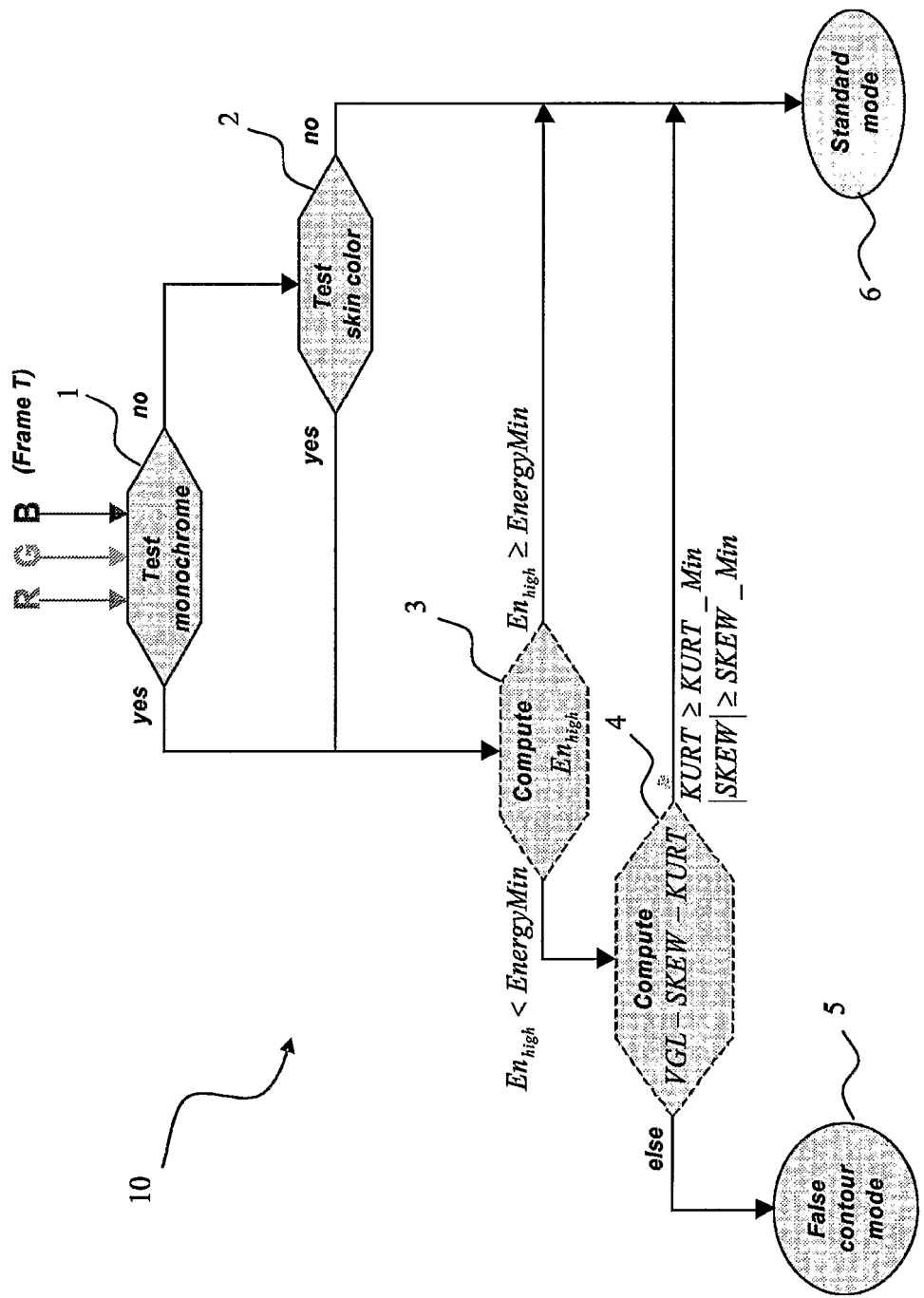
Figure 18:
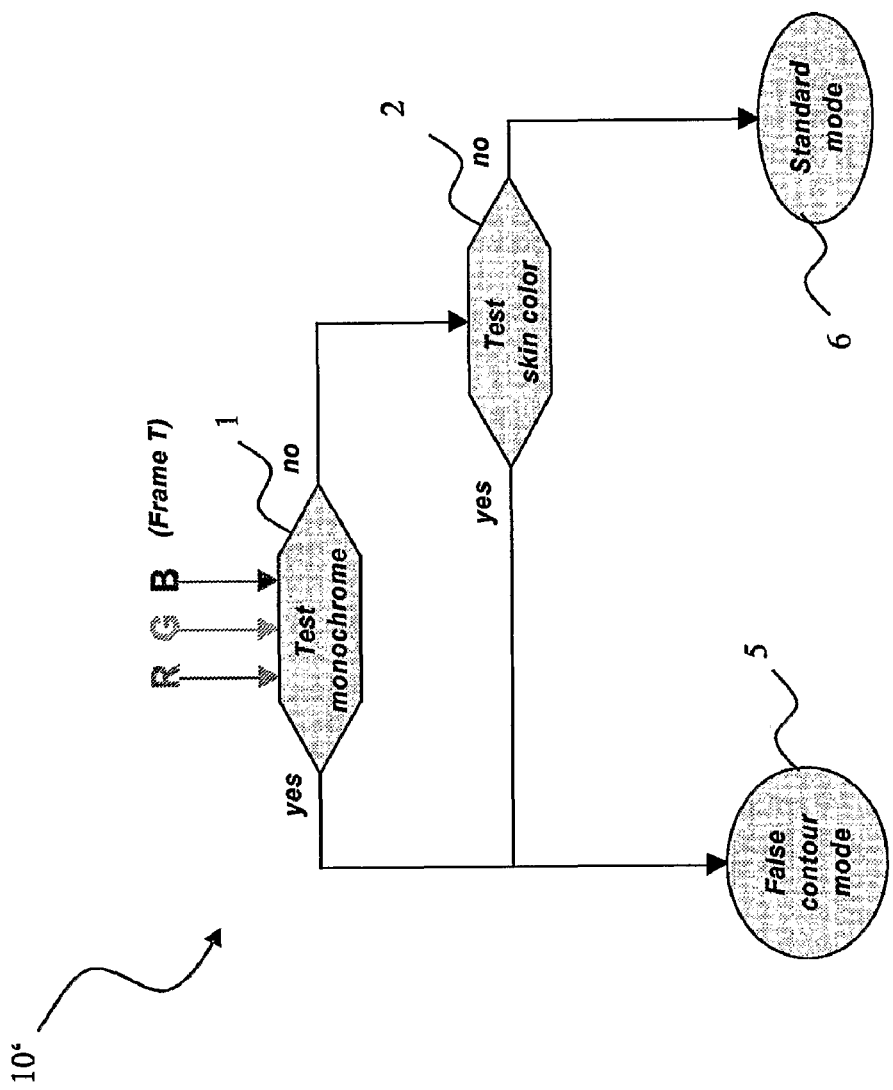

Exemplary embodiments of the invention are illustrated in the drawings and in more detail in the following description. The drawings showing in:

FIG. 1 the composition of a frame period for the binary code;

FIG. 2 the centre of gravity of three video levels;

FIG. 3 the centre of gravity of sub-fields;

FIG. 4 the temporal gravity centre depending on the video level;

FIG. 5 chosen video levels for GCC;

FIG. 6 the centre of gravity for different sub-field arrangements for the video levels;

FIG. 7. a colour difference vector space;

FIG. 8 a data processing for colour analysis;

FIG. 9 a diagram for analysing spatial frequencies;

FIG. 10 a histogram analysis of a first skin part;

FIG. 11 a spectrum analysis of the first skin part;

FIG. 12 a histogram analysis of a second skin part;

FIG. 13 a spectrum analysis of the second skin part;

FIG. 14 a histogram analysis of a background texture;

FIG. 15 a spectrum analysis of the background texture;

FIG. 16 a segmentation of a picture with skin areas;

FIG. 17 a signal flow diagram for code switching;

FIG. 18 a signal flow diagram of simplified code switching; and

Figure 19:
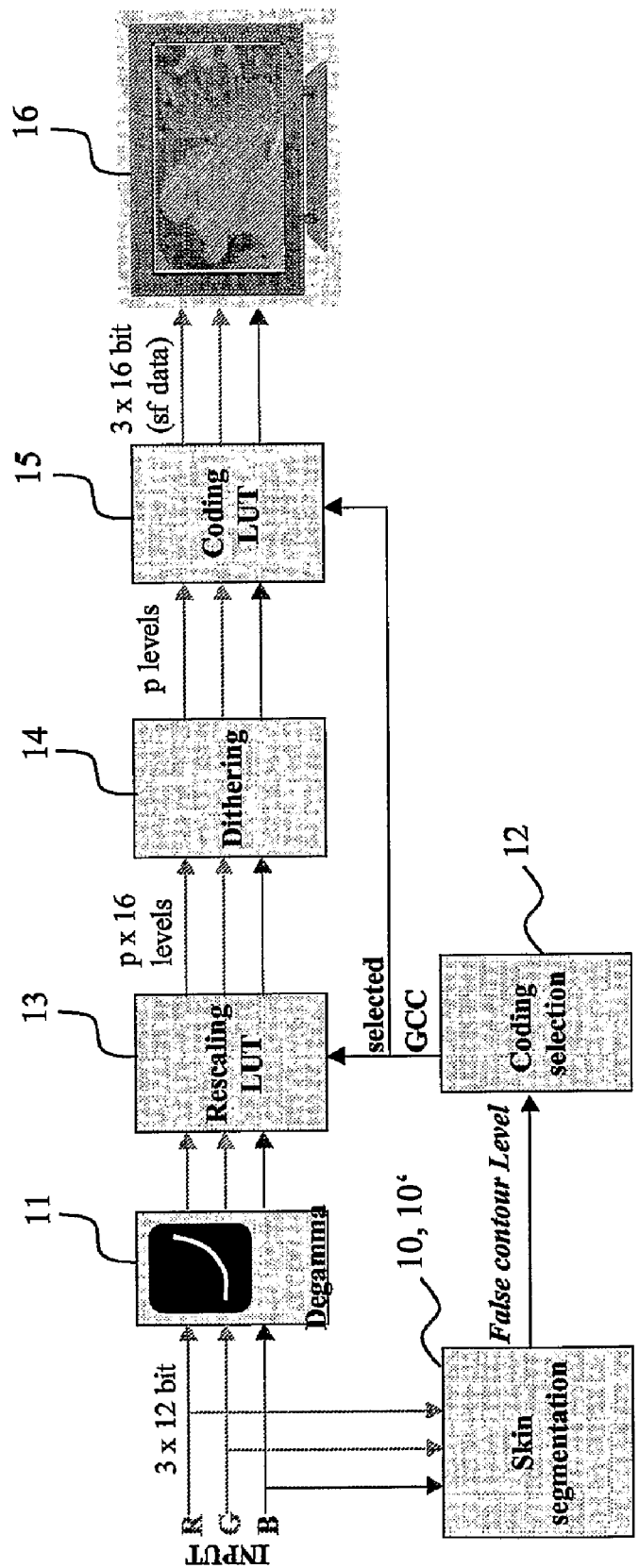

FIG. 19 a block diagram for implementing the inventive concept.

EXEMPLARY EMBODIMENTS

According to the inventive concept the GCC is not used in all areas of the picture. However, a further advantage of the GCC concept is based on the fact that the GCC selected levels are a subset of existing levels. Therefore, if a part of the picture is using GCC whereas the rest is coded with all levels, it will not be possible for the viewer to see any differences except the fact that there will be some areas with more or less noise and more or less visible false contour. Generally, the frontiers between areas coded with GCC and standard areas are invisible! This property of the GCC concept enables to define a texture-based concept.

This new concept is based on a segmentation of the picture in two types of areas:

- areas were the false contour effect is not really disturbing for the viewer (landscape, grass, trees, buildings, water . . . . )
- areas were the false contour effect is really disturbing since unnatural (large and homogeneous skin areas)

Now, the idea is to define two types of modes for these two types of areas:

- False contour critical mode: GCC really optimized for false contour (more noise).
- Standard mode: NO GCC or GCC having a lot of selected levels (almost no noise).

Two such examples are given below:

The main issue is that the noise causes artefacts which in most times are visible and therefore it should be reduced to a minimum. On the other hand, the false contour effect is only visible on specific sequences and should only be tackled on these sequences and above all only on critical parts of such sequences. The aim of this invention is the segmentation of the picture in specific areas where the false contour effect will be tackled.

A first important segmentation parameter is the colour itself. Two situations could happen:

a) Black and white picture: this can be tested by using the YUV information (U and V being almost negligible for the whole picture)

The false contour critical mode is activated for the whole picture. Indeed, it will be very disturbing on a black and white film to see coloured edges (false contour lines).

b) Normal coloured picture

If the current pixel is almost grey (Red, green and blue components are very similar), the area is sensitive to false contour. Indeed, false contour introduces coloured edges, which are not awaited by the human eye on grey areas! In that case, the false contour critical mode is activated for the current pixel.

If the current pixel has a skin colour (cf. description of skin colour detection below), the area is sensitive to false contour. Indeed, false contour introduces coloured edges (blue, red . . . ), which are not awaited by the human eye on skin areas! In that case, the false contour critical mode is activated for the current pixel.

In all other cases, the standard mode is activated.

Detection of skin hue is based upon the fact that, for a majority of people, the skin hue is usually located in an area approximately between a phase angle of about 115° and 135° in the CbCr colour difference vector space. In addition, the CbCr vector amplitude is usually located somewhere between 10% and 50% of maximum colour saturation. Objects with less or more colour saturation that are located near the skin hue axis are not likely to be human skin and can be disregarded in the detection process.

FIG. 7 shows a vectorscope display of the CbCr colour space phase and amplitude (yellow markers) of the skin hue located at the cursor on the subject's face. The phase angle of 124° and amplitude of 23% are located well within the desired skin hue detection area.

Additionally, the luminance component can also be employed as a further skin hue detection criterion, as it is the case when RGB colour components are used (compare to FIG. 8). Skin colour detection for false contour correction is not as critical as might be the case for other applications due to the fact that incorrect detection would, for the most part, not result in any major derogatory effects. A low pass filter and level threshold should be implemented before the detection process to prevent the false contour correction being triggered by small areas of colour, which might be located within the skin hue detection coordinates.

A block diagram of proposed skin detection is shown in FIG. 8. First, the RGB-signal is subjected to a low pass-filter and a level threshold. The phase Ph and the amplitude Am of the resulting signal are extracted and fed to a decision block. If the phase Ph and the amplitude Am lie within the coordinates of $Ph_{min}$, $Ph_{max}$, $Am_{min}$ and $Am_{max}$ a "skin on" signal is output. Otherwise a "skin off" signal is output from the decision block.

The values for $Ph_{min}$, $Ph_{max}$, $Am_{min}$ and $Am_{max}$ are predetermined values coming from external registers. The values used in the above example are:

$Ph_{min}$=115°

$Ph_{max}$=135°

$Am_{min}$=10%

$Am_{max}$=50%

The visibility of the false contour is very high on homogeneous areas like skin but its visibility is reduced on high texturized objects. In the previous paragraph, a way to detect the skin colour was presented. In order to further increase the accuracy of this detection, it is proposed to add a verification of the skin texture by checking the homogeneity of the skin. In other words, it will be checked that there is almost no real texture present on the skin colour area before activating the "false contour critical mode" on this area. Indeed, when the area contains too many textures, it is an indication of a non-skin area or an area where the false contour is not disturbing because of the texture itself (the texture will hide the false contour effect).

The detection presented here is an optional detection, which is a bit more complicated but this should enable a further reduction of the use of the "false contour critical mode" on area that are not really contaminated by this effect.

For the detection, a block N×M around the current pixel P(x; y) having N and M as odd number is defined. The current pixel is located exactly at the centre of the block ($x_0$; $y_0$). For each colour component, one has the following parameters related to the histogram of the selected block:

Mean of Grey Level:

$$MGL(x_0; y_0) = \frac{1}{N \times M} \cdot \sum_{x=x_0-\frac{N}{2}}^{x=x_0+\frac{N}{2}} \sum_{y=y_0-\frac{M}{2}}^{y=y_0+\frac{M}{2}} P(x; y)$$

This parameter represents the mean value of the histogram (position in the greyscale)

Variance of Grey Level:

$$VGL(x_0; y_0) = \frac{1}{N \times M} \cdot \sum_{x=x_0-\frac{N}{2}}^{x=x_0+\frac{N}{2}} \sum_{y=y_0-\frac{M}{2}}^{y=y_0+\frac{M}{2}} [P(x; y) - MGL(x_0; y_0)]^2$$

This parameter represents the repartition of the grey levels around the mean value.

Skewness:

$$SKEW(x_0; y_0) = \frac{1}{N \times M} \cdot \sum_{x=x_0-\frac{N}{2}}^{x=x_0+\frac{N}{2}} \sum_{y=y_0-\frac{M}{2}}^{y=y_0+\frac{M}{2}} [P(x; y) - MGL(x_0; y_0)]^3$$

This parameter measures the dissimilarity of the histogram (well balanced around its mean value or not)

Kurtosis:

$$KURT(x_0; y_0) = \frac{1}{N \times M} \cdot \sum_{x=x_0-\frac{N}{2}}^{x=x_0+\frac{N}{2}} \sum_{y=y_0-\frac{M}{2}}^{y=y_0+\frac{M}{2}} [P(x; y) - MGL(x_0; y_0)]^4$$

This parameter gives an information about the general form of the histogram (sharp and slender or rather flattened).

From all these parameters, mostly the SKEW and KURT parameters will be used for evaluating the texture.

In parallel to that, the high frequencies located in the block have to be analysed. Indeed, a homogeneous block will have only low frequencies whereas a strong texturized block will have much more energy located in its high frequencies. The frequencies will be analysed by using the Fourier trans-formation of the block:

$$F(u; v) = \sum_{x=x_0-\frac{N}{2}}^{x=x_0+\frac{N}{2}} \sum_{y=y_0-\frac{N}{2}}^{y=y_0+\frac{N}{2}} P(x; y) \cdot \exp\left(-2\pi i\left(\frac{u \cdot x}{N} + \frac{v \cdot y}{M}\right)\right)$$

The function $F(u; v)$ represents the repartition of the spatial frequencies of the block in the Fourier domain (u: horizontal frequencies–v: vertical frequencies). The Fourier domain is shown in FIG. 9.

The area located between [−L; L] and [−K; K] represent the low frequencies area. The rest is defined as area H (for high frequencies). Therefore, in order to determine how many energy is located in the low frequencies, one will use the following computation:

$$En_{high} = \int\int_H |F(u; v)|^2 \cdot du \cdot dv \text{ where:}$$

$$|F(u; v)|^2 = \left[\left(\sum_{x=x_0-\frac{N}{2}}^{x=x_0+\frac{N}{2}} \sum_{y=y_0-\frac{N}{2}}^{y=y_0+\frac{N}{2}} P(x; y) \cdot \cos\left(-2\pi i\left(\frac{u \cdot x}{N} + \frac{v \cdot y}{M}\right)\right)\right)^2 + \left(\sum_{x=x_0-\frac{N}{2}}^{x=x_0+\frac{N}{2}} \sum_{y=y_0-\frac{N}{2}}^{y=y_0+\frac{N}{2}} P(x; y) \cdot \sin\left(-2\pi i\left(\frac{u \cdot x}{N} + \frac{v \cdot y}{M}\right)\right)\right)^2\right]$$

Finally the decision to activate or not the specific false contour critical mode is given as following:

---

If $En_{high} \geq$ EnergyMin activation of standard mode
else if $En_{high} <$ EnergyMin
    If |SKEW| $\geq$ SKEW_Min and KURT $\geq$ KURT_Min activation of
    standard mode.
    Else use specific false contour mode.

---

Now, the above described concept will be illustrated by the way of an example. For that purpose, a picture of a woman located in front of trees and flowers is taken and three areas for texture analysis are defined: block 1 (on the cheek), block 2 (on the chin) and block 3 (on a flower). The texture analysis of this picture is illustrated in connection with FIGS. 10 to 16.

As shown in FIG. 10, a first selected area (block 1) is on a pure homogeneous skin area. Histograms concerning the green, the blue and the red signals are depicted on the right side of FIG. 10. On the right side of each histogram the statistical values MGL, VGL, SKEW and KURT are presented. In the histograms the number of pixels is drawn over the video level.

The histogram is quite sharp and the parameters of skewness and kurtosis are quite small. This might indicate a homogeneous area.

The results of the spectrum analysis of block 1 are shown in FIG. 11 (one quadrant of the spectral room for each of the three colours). In these diagrams the energy for each colour is located at the low frequencies (left corner). This means that the analyzed block is mainly a homogeneous area with almost no texture. The energy located at the high frequencies is negligible and the area will be handled as a homogeneous one.

FIG. 12 shows the histogram analysis of a selected area (block 2) on a pure homogeneous skin area excepted a mole (beauty spot). The histograms are larger than for block 1 and the parameters of skewness and kurtosis are bigger but not too strong, which may still indicate a homogeneous area.

The results of the spectrum analysis of block 2 are shown in FIG. 13. The energy is located at the low frequencies (left corner). There is some high frequency (bottom left corner) but negligible. This means that the analysed block is mainly an homogeneous area with almost no texture excepted a transition: this transition corresponds to the edge between skin and mole. Anyway, the energy located at the high frequencies will be negligible and the area will be handled as a homogeneous one.

FIG. 14 shows the histogram analysis of a selected area (block 3) on a flower that contains a lot of textures. The histograms are larger than for block 1 and the parameters of skewness and kurtosis are very strong compared to the two previous cases. This indicates a non-homogeneous area.

The results of the spectrum analysis of block 3 are shown in FIG. 15. The energy is more located towards the high frequencies (middle area). There is only few energy at low frequencies (left corner) but negligible. This means that the analyzed block is mainly a block having a lot of texture that will not require a specific false contour treatment independently on its colour (even if its tone is similar to skin tone).

FIG. 16 shows the result of the segmentation obtained from the analysis of the picture of the woman with flowers. The areas in grey correspond to areas where a specific false contour coding will be used whereas the rest will be coded with a standard approach. The segmentation on the basis of an analysis of histograms and energy clearly leads to the skin area of the woman.

FIG. 17 illustrates an algorithm of the current invention for the decision about the coding to be used in a specific area. The input R,G,B signal from frame T is analyzed by a monochrome test in a monochrome test unit 1 and by a skin colour test in a skin colour test unit 2 if the pixel is not monochrome. Then, if the current pixel is either monochrome or has a skin colour, its texture will be analyzed:

If the texture has almost no high frequency computed and tested in the energy computing unit 3 and low skewness and kurtosis parameters (computed and tested in the VGL, SKEW and KURT computing unit 4), then the specific false contour mode 5 is activated.

If the current area has too much texture (high frequencies or high kurtosis and skewness), the standard mode 6 is used.

The example presented in FIG. 17 is a full featured example using the optional detection of texture for example by energy and/or histogram analysis, which is the more robust concept. A simplified version based only on monochrome detection 1 and skin colour detection 2, which is less robust but simpler to implement is shown in FIG. 18. In that case, the false contour mode 5 is activated if the pixel is monochrome or if its colour is a skin colour. In all other situations, the standard mode 6 will be applied.

In next paragraph, it is shown how the segmentation part is implemented in a overall PDP structure.

An implementation of the overall concept according to the present invention is presented on FIG. 19. The input R, G, B video data (3×12 bits) is forwarded directly to the skin segmentation part 10 of FIG. 17 or 10' of FIG. 18 before being forwarded to the degamma block 11 performing a quadratic function under the form $$Out = 4095 \times \left(\frac{Input}{MAX}\right)^\gamma$$

where $\gamma$ is more or less equal to 2.2 and MAX represents the highest possible input value. The output of the degamma unit 11 has more than 12 bits to be able to render correctly low levels.

The skin segmentation part 10, 10' is performing a segmentation pixel per pixel in order to decide whether a specific false contour coding or rather a standard coding should be used. The output false contour level is sent to a coding selection block 12, which will select the appropriate GCC coding or standard coding to be used. Based on this selected mode, the LUT of a rescaling unit 13 and the LUT of a coding block 15 are updated. The resealing unit 13 performs the GCC, whereas the coding unit 15 performs the usual sub-field coding. Between them, the dithering unit 14 will add more than 4 bits dithering to correctly render the video signal. It should be noticed that the output of the resealing unit 13 has p*16 different output levels where p represents the total amount of GCC codewords used (40 of 255 in our example). The 4 additional bits are used for dithering purposes in order to have enough discrete video levels at the output. After the dithering p levels of each signal RGB remain. The sub-field coding in unit 15 generates sub-field data having 16 bits for each colour signal RGB. The resulting sub-field data are sent to a PDP 16.

The above described embodiment is directed to a PDP. However, any other kind of display using PWM for illuminating the pixels may profit from the present invention.

The invention claimed is:

1. Method for processing video data for display on a display device having a plurality of luminous elements corresponding to the pixels of a picture, wherein a time of a video frame or field is divided into a plurality of sub-fields during which the luminous elements can be activated for light emission in small pulses corresponding to a sub-field code word of n bits used for en-coding the p possible video levels lighting a pixel, comprising the steps of:

encoding a first part of the picture using a first encoding method, wherein among the set of possible video levels for lighting a pixel, a sub-set of m video levels with n<m<p is selected, which is used for light generation, said m values being selected according to the rule that the temporal centre of gravity for the light generation of the corresponding sub-field code words grows continuously with the video level, selecting said first part of the picture on the basis of predetermined criteria including an area having a predetermined skin colour, determined by the phase angle and amplitude of a colour space diagram, or a grey tone, and encoding at least one second part different from said first part of the picture using a second encoding method different from said first encoding method.

2. Method according to claim 1, wherein the selection criteria for said first part are:

homogeneous area having a size larger than a predetermined minimum size.

3. Method according to claim 2, wherein said homogeneous area has a predetermined texture.

4. Method according to claim 1, wherein the first encoding method is not used in an area, if the skewness of said area is larger than a minimum skewness and a kurtosis of said area is larger than an minimum kurtosis.

5. Device for processing video data for display on a display device having a plurality of luminous elements corresponding to the pixels of a picture, wherein a time of a video frame or field is divided into a plurality of sub-fields during which the luminous elements can be activated for light emission in small pulses corresponding to a sub-field code word of n bits used for encoding the p possible video levels lighting a pixel, comprising:

encoding means for encoding a first part of the picture using a first encoding method, wherein among a pre-given set of possible video levels for lighting a pixel, a sub-set of m video levels with n<m<p is selected, which is used for light generation, said m values being selected according to the rule that the temporal centre of gravity for the light generation of the corresponding sub-field code words grow continuously with the video level, selecting means connected to said encoding means for selecting said first part of the picture on the basis of predetermined criteria including a predetermined skin colour, determined by the phase angle and amplitude of a colour space diagram, or a grey tone, wherein said encoding means is adapted for encoding at least one second part different from said first part of the picture using a second encoding method different from said first encoding method.

6. Device according to claim 5, wherein the selection criteria for said first part are:

homogeneous area having a size larger than a predetermined minimum size.

7. Device according to claim 5, wherein the first encoding method is not used in an area, if the skewness of said area is larger than a minimum skewness and a kurtosis of said area is larger than a minimum kurtosis.

* * * * *